(12) United States Patent
Roberts et al.

(10) Patent No.: US 8,509,747 B2
(45) Date of Patent: Aug. 13, 2013

(54) MULTIPLE SERVICES SUMMARIZATION

(75) Inventors: Brian Roberts, Frisco, TX (US);
Donald H. Relyea, Dallas, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 731 days.

(21) Appl. No.: 12/625,327

(22) Filed: Nov. 24, 2009

(65) Prior Publication Data

US 2011/0124292 A1 May 26, 2011

(51) Int. Cl.
*H04M 3/42* (2006.01)
(52) U.S. Cl.
USPC .............. 455/414.1; 455/412.1; 455/414.2; 455/414.3; 455/550.1; 455/3.04; 715/700; 370/312; 370/468

(58) Field of Classification Search
USPC .......... 455/414.1, 414.2, 566, 67.7; 715/700
See application file for complete search history.

(56) References Cited

U.S. PATENT DOCUMENTS

| 7,477,892 | B2 * | 1/2009 | Coward et al. | 455/414.1 |
|---|---|---|---|---|
| 7,843,864 | B2 * | 11/2010 | Vermola et al. | 370/312 |
| 2004/0198331 | A1 * | 10/2004 | Coward et al. | 455/414.1 |
| 2005/0090235 | A1 * | 4/2005 | Vermola et al. | 455/414.3 |
| 2005/0210387 | A1 * | 9/2005 | Alagappan et al. | 715/700 |
| 2008/0274721 | A1 * | 11/2008 | Stagnetto | 455/414.2 |

* cited by examiner

*Primary Examiner* — April G Gonzales

(57) ABSTRACT

A system comprises a mobile device configured to facilitate communications with a network. The system may further comprise a plurality of various data services, an identification service and an aggregation service. The mobile device identifies a subject and initiates a search for the subject, searching at least one of the data services. The mobile device then provides a summary of the data to the user via the user interface on the mobile device.

28 Claims, 4 Drawing Sheets

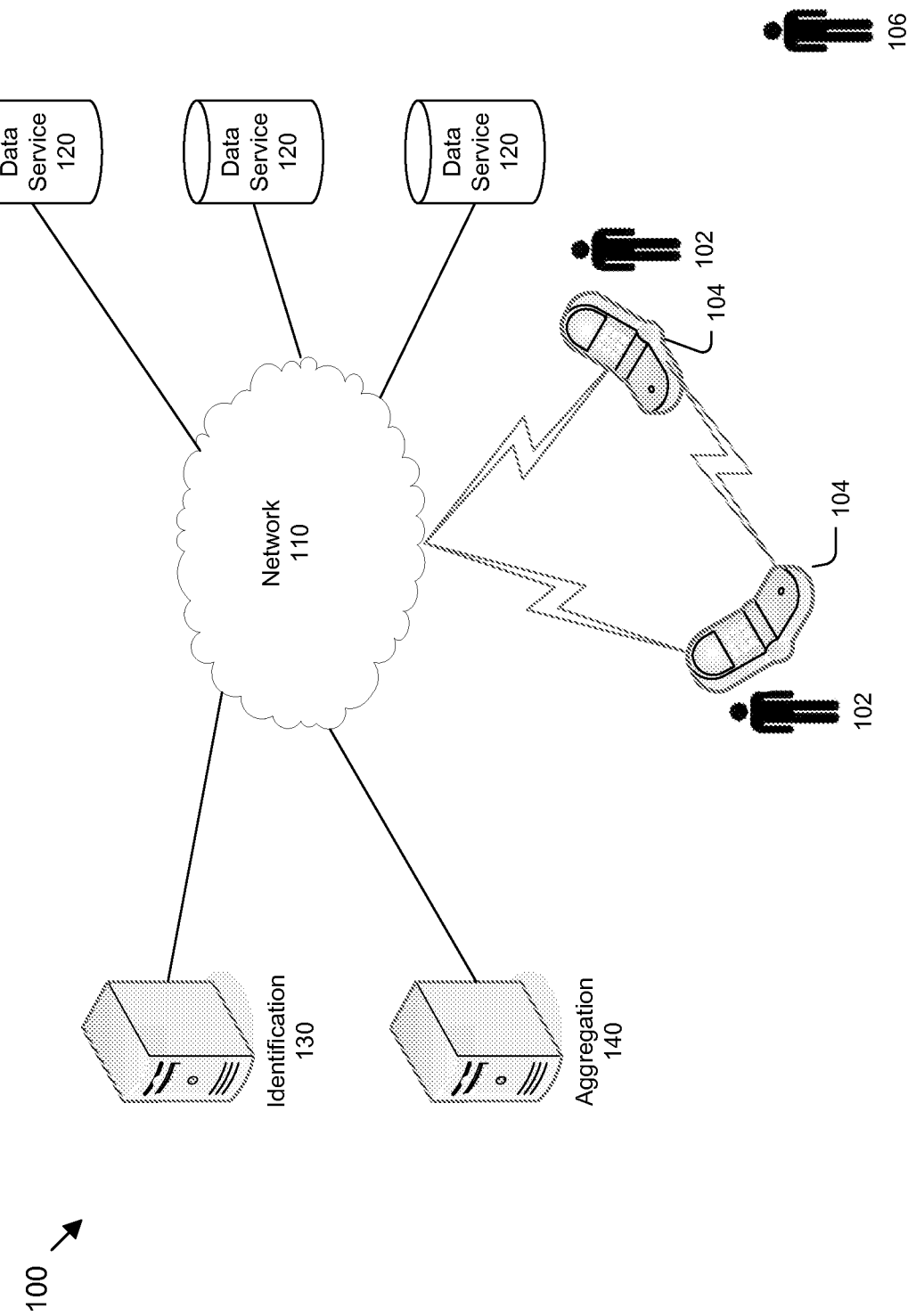

MULTIPLE SERVICES SUMMARIZATION

BACKGROUND

The amount of electronic information available to users of mobile devices has increased steadily with the use of web-based social and professional services and applications. These applications allow users to share information with each other, such as sharing personal information and tracking the status of projects. However, a user is often required to use each application separately. Further, while search engines are commonly used to perform broader searches, such searches often don't include any secured data, and often provide the retrieved data in a pre-set format.

BRIEF DESCRIPTION OF THE DRAWINGS

FIG. 1 illustrates an exemplary system for facilitating searching, organizing, and summarizing data from multiple data services.

DETAILED DESCRIPTION

Figures 2A, 2B, 2C:
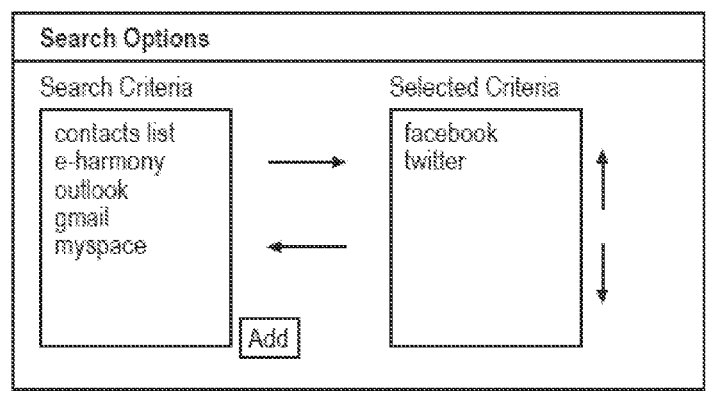
FIGS. 2A-2C illustrate exemplary user interface option blocks for selecting search criteria within a mobile device.

The exemplary system facilitates searching multiple, often separate, data services, which may be operated by different entities. Such data services may include various professional and/or social networking services, project management applications, customer resource management (CRM) applications, customer contact services, or any other accessible data service. The exemplary system further facilitates organizing the retrieved data and summarizing the data for a user according to various system-defined and user-defined criteria. For example, a user and a subject may share information in one data service based on various system-defined criteria, and a user may further provide criteria for searching and summarizing data relating to the subject. Further, the exemplary system allows a user to automatically identify a subject, such as a person, using identification data, such as an image or voice recording of the person. Further, the exemplary system may utilize one or more of the data services to facilitate identifying the subject. Following the initial search, the exemplary system may perform subsequent searches regarding the identified subject and a particular topic, for example, based on keywords being spoken during a conversation.

FIG. 1 illustrates an exemplary system 100 that allows a user 102, via a mobile device 104, to search, organize, and summarize data from multiple data services 120 regarding a particular subject 106, such as a person. For example, user 102 may be attending a conference and see a subject 106 that is a past acquaintance. User 102 may be unable to identify the subject or recall any personal information about the subject. However, using system 100, user 102 can identify subject 106 using some identifying information, like a photograph, and gather a brief summary of data relating to the subject from a plurality of data services 120. System 100 may take many different forms and include multiple and/or alternate components and facilities. While an exemplary system 100 is shown in FIG. 1, the exemplary components illustrated in the figure are not intended to be limiting. Indeed, additional or alternative components and/or implementations may be used.

As illustrated in FIG. 1, system 100 includes mobile devices 104, each of which is operated by a user 102 and capable of communicating with various systems and devices via a network 110. Network 110 may facilitate communication between mobile devices 104, various data services 120, as well as other systems and services. For example, as illustrated in FIG. 1, network 110 may also facilitate communication with an identification system 130 and an aggregation system 140.

Mobile devices 104 allow a user 102 to identify a subject 106, search multiple data services 120, and provide a potentially personalized summary of data from all or a subset of data services 120 regarding the subject. Mobile devices 104 may be any cellular phone, personal digital assistant (PDA), notebook computer, personal computer, or the like that is capable of communicating with various systems via network 110. Mobile devices 104 generally include a processor, memory, a computer-readable and/or processor-readable medium, and a user interface that allows user 102 to interact with the device. Mobile device 104 may access network 110 using any known mechanism, including via a wired or wireless communications interface. Generally, mobile device 104 includes an operating system as well as various applications, such as an address book, a content list, a photo album, an application associated with a data service 120, and a data summarization application. The address book, for example, may include personal information including a person's name, phone number, address, employment information, and the like. An application associated with a data service 120 may facilitate communication with one particular data service 120, including facilitating verifying a user's credentials to access a stored profile. In addition, mobile device 104 may include data to facilitate identifying a person, such as a photo of the person, a unique identifier (e.g., a barcode), a voice print or sound recording, and the like.

Mobile device 104 may also include hardware devices that facilitate identifying a subject, such as a camera, a microphone, and a wireless communications interface. The camera may be capable of taking photographs or capturing video and storing the resulting images locally on mobile device 104. The microphone may also be capable of recording audio sounds and storing the sounds locally on the device. Mobile device 104 may also include various wireless communications interfaces, such as a Bluetooth adaptor capable of transferring data between mobile devices 104, or between a mobile device 104 and another electronic device. In addition, as previously discussed, mobile device 104 includes a communications interface that facilitates voice and/or data communications with other systems and devices via network 110.

Network 110 typically includes both wired and wireless communication networks, and enables telecommunications devices to communicate voice and data with one another. For example, network 110 typically facilitates voice and/or data communications between multiple mobile devices 104, data services 120, identification system 130, and aggregation system 140. Network 110 may connect to and/or include a Public Switched Telephone Network (PSTN), a wireless network, satellite communications, or any other network/equipment used to facilitate voice and/or data communications, allowing mobile device 104 to communicate with the devices illustrated in system 100, such as data services 120.

Data services 120 are generally various personal or professional services operated by different entities. Examples of a data service 120 include, but are not limited to, customer resource management systems, contact management systems, project management systems, as well as services such as Facebook®, YouTube®, LinkedIn®, MySpace®, as well as any other data service that facilitates the sharing of personal and/or professional information between a user 102 and a subject 106. Each data service 120 may be categorized as a professional data service, personal data service, or some other category. Each data service 120 may require a user account and/or to authenticate a user before providing data, or a certain level of personalized data. Thus, user 102 may utilize an application associated with a data service 120 to provide the appropriate credentials and access a stored profile, including data associated with a particular subject 106.

Within a data service 120, a user 102 and a subject 106 may establish a certain relationship. For example, a supervisor and an employee may have established roles within a project management system, and also be connected via one or more social networking services. For example, a user 102 may have an established relationship with a subject 106 (e.g., another user of a particular data service 120), allowing user 102 to access certain data associated with subject 106, such as a personal blog, project status updates, a contact list, and any other data stored in data services 120 that may be selectively accessible to user 102.

In certain examples, a user 102 and a subject 106 may each separately establish an account or profile with one or more data services 120. User 102 and subject 106 may also establish a relationship with one another in one or more data services 120. The data accessible to one another in each data service 120 may be based on such a pre-existing relationship within each data service 120. Thus, any data associated with subject 106 in each data service 120 may be based on each person's profile, preference data, access permissions, and relationship.

Further, users 102 may utilize different credentials or authentication mechanisms to access their account within different data services 120. As discussed in greater detail below, system 100 allows a user 102 to automatically identify a subject 106, and generate a potentially personalized data summary that includes data from a plurality of data services 120, allowing a user to access a high-level overview of data from a plurality of data services 120. Further, system 100 may utilize stored relationship data in one or more data services 120 to facilitate identifying a particular subject 106. System 100 may further attempt to determine the type of relationship between user 102 and subject 106 (e.g., professional, personal, acquaintance, close friend, family, or some other relationship characteristic), and utilize the determined type of relationship to summarize the data in a particular way. In one example, system 100 utilizes identification service 130 to identify a subject 106, and an aggregation service 140 to perform a search in each of a plurality of data services 120.

Identification service 130 generally includes one or more computer systems that facilitate identifying a subject 106 using some form of identification information provided by a mobile device 104. For example, mobile device 104 may take a picture of a subject 106, such as a photograph of a person's face. If mobile device 104 cannot identify the subject in the photograph, mobile device 104 may send the photo to identification service 130. Identification service 130 may store any number of identifying characteristics of a subject 106, or may communicate with various databases that store such information. In another example, mobile device 104 sends a name to identification service 130. In turn, identification service 130 accesses a profile associated with user 102 in one or more data services 120 and attempts to correlate the provided name with another user of data service 120, for example, with a user that has a pre-existing relationship with user 102 in that particular data service 120.

In another example, identification service 130 may associate the identification information supplied by mobile device 104 with more than one potential subject. For instance, if the identification data is a name provided to the identification service, more than one subject, or person, may be associated with that name within any given data service 120. For instance, many users with the same name may each provide a profile within a social networking service. User 102 may select a subject from a listing of potential subjects provided via the user interface. System 100 may also select one subject out of the potential subjects based on information supplied by mobile device 104. For example, the name supplied by mobile device 104 may also be stored as an entry in the address book of mobile device 104. The entry may include information about subject 106 such as his or her address, business affiliation, and the like. Based on this information stored locally in mobile device 106, identification service 130 may distinguish the subject from other potential subjects with the same name based on information such as subject's address. Using the social networking example, system 100 may distinguish between two profiles using an address corresponding to subject 106.

In addition, information about subject 106 from the user's mobile device 104, may accompany the identification data and facilitate the search for the subject within data services 120. A search may include logging into a data service 120 and conducting a search on a name associated with the identified subject. For example, the information accompanying the identification data may reveal the subject's professional affiliation. In response, a project management system within a data service 120 may be searched to acquire data associated with the given business affiliation. Thus, search criteria are established using information about subject 106 from mobile device 104.

Once a subject 106 is identified, identification service 130 may send the identity of the subject 106 back to the requesting mobile device 104. Once a subject 106 is identified, system 100 can search multiple data services 120 for data relating to the identified subject, potentially utilizing aggregations service 140.

Aggregation service 140 generally includes one or more computer systems that search one or more data services 120, potentially in response to a request from a mobile device 104. For example, aggregation service 140 may be configured to access a plurality of data services 120, and may further be configured to search all or a subset of such data services 120 based on a request from a mobile device 104. Aggregation service 140 may store log-in information (e.g., usernames and passwords) for user 102 for a plurality of data services 120, thus allowing aggregation service 140 to access data associated with subject 106 that is selectively accessible to user 102 in each data service 120. Once a subject 106 is identified, mobile device 104 may send search instructions, including search criteria, to aggregation service 140. Aggregation service 140 receives the identified subject as well as information about the user 102 from the user's mobile device 104, and can then conduct a search of data services 120. A search may include logging into a data service 120 and conducting a search on a name associated with the identified subject 106. Such a scenario may be beneficial when dealing with a mobile device 104 with limited access to network 110, low bandwidth, or in an enterprise that desires to have a more efficient system 100 for handling many such searches.

Generally, mobile device 104 is capable of performing one or more searches of data services 120 to gather information about a subject 106, and display the results of that search in an organized manner through a user interface. Subject 106 is generally another person, but may be a landmark, a location, a business, or the like. As previously mentioned, mobile device 104 receives some identifying or identification data associated with a particular subject 106. Such data includes, but is not limited to, a photograph or video of the subject, a bar code, a voice recording, location data, a message communicated wirelessly from another mobile device 104 associated with the subject 106, or some other data that can be used to identify a subject, particularly from a distance.

In a specific example, information about subject 106 from the user's mobile device 104 may accompany the identification data and facilitate the search for the subject within aggregation service 140. Aggregation service 140 may then search data services 120 associated with the information. For example, the information accompanying the identification data may reveal the subject's professional affiliation. In response, aggregation service 140 may search a project management system to acquire data associated with the given business affiliation. Thus, search criteria are established using information about subject 106 from mobile device 104.

System 100 includes mobile device 104. Mobile device 104 receives some identification data, mobile device 104 can attempt to identify the subject 106. For example, user 102 may acquire identification data by taking a picture of subject 102 using a camera included in mobile device 104. Mobile device 104 may then attempt to identify subject 106, for example, by using facial recognition software, and comparing the photo to other photos stored within mobile device 104. If mobile device 104 can identify subject 106, then the identification data will then be used to initiate a search of data services 120 regarding the subject. If mobile device 104 cannot identify subject 106, mobile device 104 may send the identification data to identification service 130 for assistance.

Other examples of identification data include, but are not limited to: images, sounds, videos, and any biometric data. Thus, if a sound file is recorded using the mobile device's microphone, the sound file could be compared to existing files stored within the mobile device, for example, to identify a person using voice recognition. The identification data, such as a photo or sound file can come from other hardware devices such as those already mentioned. For instance, the user may insert a memory card and use a photo from the memory card as the identification data. Further, the user may acquire identification data through frequency transmissions such as Bluetooth. For example, mobile device 104 may wirelessly broadcast certain identifying data (e.g., a user's name, a phone number, a mobile identification number, a mobile dialing number, or a mobile serial number) to various devices. In one example, mobile devices 104 can identify users 102 via a wireless short-range radio transmission utilizing a protocol such as Bluetooth.

After the mobile device identifies the subject, the search may be initiated. The search may be initiated automatically upon recognition of identification data, or the user may initiate the search through the user interface. A search may be formulated using any number of criteria, including user-defined criteria. Further, as discussed below, following a first search and data summarization, subsequent searches may be initiated focusing on various topics between a user and an identified subject.

Specific search criteria and/or filter options may be selected, as illustrated by way of example in FIGS. 2A-2C. Generally, search criteria limit the search to efficiently navigate through multiple data services 120 to ensure faster and more focused results. Such criteria may be applied generally to all such searches. The search criteria may also be applied to groups of subjects (e.g., personal, professional, family, etc.), or to individual subjects. Further, such criteria may be based on the identity of the subject, their status, a location, or some other contextual or user-defined criteria. For example, the search criteria could limit the search to certain data services 120, to certain date intervals, to groups or categories of data services 120 (e.g., personal or professional), or the like.

As illustrated in FIG. 2A, a user may be presented with a user interface allowing the user to select pre-defined filters (e.g., search criteria), define their own search criteria, initiate a search, or access some third party server, such as aggregation service 140. In one example, mobile device 104 provides a set of default search criteria, such as a specific group and/or sequence of data services 120 to query; searching based on a time frame or date of entry, a size of a data set, frequency of data, or the like.

As illustrated in FIG. 2B, mobile device 104 may provide user 102 with a plurality of predefined filters. A predefined filter may also be created by user 102 and saved for later use. For example, user 102 may elect to use a professional filter, and thereby only search data services 102 relating to professional services, as opposed to personal services. The professional filter may trigger mobile device 104 to search only professional applications, such as project management software, a customer contact manager, a professional networking service, an enterprise calendar, and the like. In another example, user 102 may utilize a personal predefined filter, and thereby search only data services 120 that provide personal services, such as social networking sites, video/photo sharing websites, a personal web page or blog maintained by the identified subject, or the like. Further, the user may add his or her own filter, which may be customized to include any available search criteria.

User 102 may also tailor searches to include data about certain groups, e.g. specific sport teams, fantasy football leagues, church softball teams, political campaigns, and the like. For example, user 102 may create a predefined filter entitled "fantasy football." Upon selecting the "fantasy football" filter, mobile device 104 may initiate a search of data services 120 relating to the user's fantasy football league, including people in the league, teams, game schedules, and the like. As illustrated in FIG. 2C, user 102 may further identify and select individual data services 120 to use in any search, including in any predefined filter.

User 102 may be prompted with option blocks in the user interface, similar to those of FIGS. 2A-2C. User 102 may custom build the search criteria by selecting which applications to search, and in what sequence to perform the search. For example, if a user 102 is performing a search on a new acquaintance, user 102 may want to broadly search the subject starting with a general Internet search engine, and then more narrowly search social networking services, professional networking services, and the like. On the other hand, if the user is performing a search on a long-time friend, and wants to know what type of gift to purchase for this friend, the user may choose to limit the search to recent posts on the subject's blog, or recent status updates.

As previously discussed, such search criteria may be user defined, contextual, and may relate to the found data. Examples of search criteria include, but are in no way limited to, a type and/or category of a data service 120, a relationship type between user 102 and subject 106, a time frame, a time of day, a keyword, a physical location of mobile device 104, and the like. While the word criteria is used, the use of the word criteria incorporates the singular form of the word, namely criterion.

Giving an example, mobile device 104 may formulate a search based in part on the physical location of mobile device 104. The physical location may be the location at which the mobile phone is when the search is first initiated, or the physical location may be an average of where the mobile device has been physically located over a period of time. In one example, mobile device 104 may determine some information about a user's location, such as whether user 102 is in a professional or social location. Examples of a location type include, but are in no way limited to, work, home, gym, school, bar, conference, vacation, and the like. Mobile device 104 may also recognize a specific location automatically based on GPS technology, or frequency of the visit to the location. Thus, when a mobile device is located at or in close proximity to a location, mobile device 104 can further tailor a search and/or summarization based on that location. For example, if the mobile device is at the office, mobile device 104 can search, summarize, and/or organize data relating to both subject 106 and work, such as a project status involving subject 106, emails to and from subject 106, and other work-related data from potentially work-related data services 120, such as a project management system.

In addition, mobile device 104 may formulate a search based on information about subject 106 within the user's mobile device 104. This information may accompany the identification data and facilitate the search within data services 120. A search may include logging into a data service 120 and conducting a search on a name associated with the identified subject. For example, the information accompanying the identification data may reveal the subject's professional affiliation. In response, a project management system within a data service 120 may be searched to acquire data associated with the given business affiliation. Thus, search criteria are established using information about subject 106 from mobile device 104.

Following a search, data from one or more data services 120 is summarized for user 102. The summarization may take into account any combination of the above mentioned criteria and/or factors. These criteria are only to be used as examples and many other factors may play a part in the summarization of data by the mobile device 104. For instance, mobile device 104 may summarize the data based on the data acquired by the search. For example, if there is a large quantity of data returned by searching the data services, mobile device 104 may only display a portion of the data. Mobile device 104 may further only display recently updated data and exclude data that is older than a certain date.

Mobile device 104 may also summarize the data based on the type of data acquired by the search. For instance, if the data is primarily a series of status updates from various social networking services, the content of the status updates may be listed in chronological order. Further, if the data is a series of entries corresponding to several projects in a project management system in a professional setting, the data may be displayed based on frequency of the entries and/or the status of each project. Additionally, data may be displayed in a contour map display, showing clusters of related information.

Mobile device 104 may also automatically categorize subjects 106 and generate a display corresponding to that category. The categories may dictate the visual aesthetics of the display, such as a list display, map display, progress bar display, and the like. The categories may also dictate what data is displayed, and in what order. For instance, if subject 106 is a co-worker, and thus categorized as a 'professional acquaintance', the display may include a list of ongoing projects in ascending order by date. Personal information related to subject 106 under this categorization may be omitted from the display. In addition, if subject 106 is categorized as a 'friend', the subject's status updates and blog postings may be displayed, whereas data from the subject's professional applications such as project management systems may not.

A relationship factor may also be used to determine how data is summarized and displayed. As discussed, user 102 and subject 106 may establish a certain relationship through one or more applications in data services 120. Data shared between user 102 and subject 106, such as a fantasy football league, social networking systems, photo sharing cite, or the like, may be given higher priority in the summarization than data that is unique only to subject 106.

Further, the combination of factors and criteria is infinite, and these examples are only meant to demonstrate the functionality of the summarization.

In general, computing devices, such as mobile devices 104, data services 120, identification service 130, and aggregation service 140, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of well known computing devices, including, without limitation, a computer workstation, a desktop, notebook, laptop, or handheld computer, or some other known computing device.

Computing devices generally each include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.).

Figure 3:
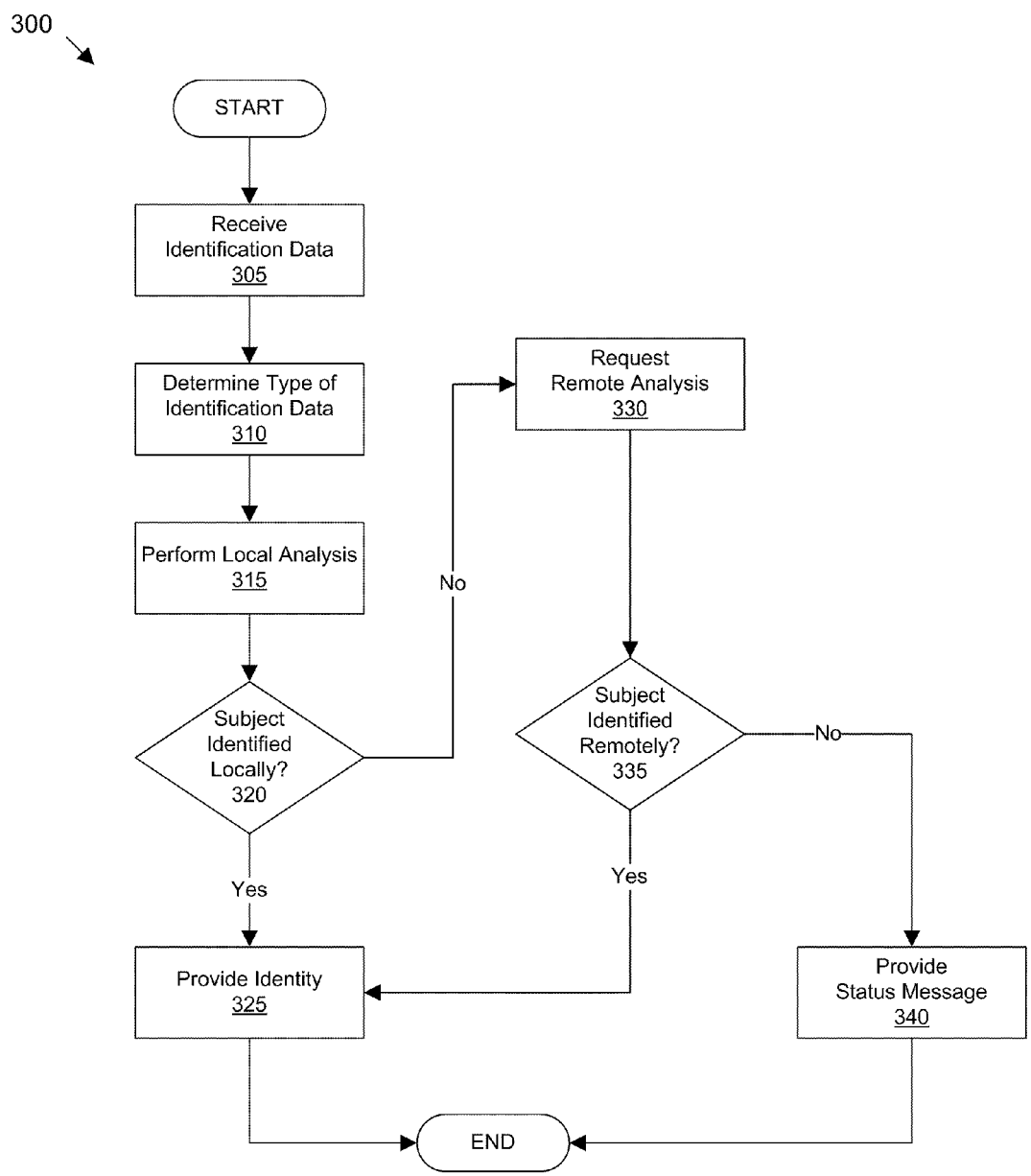
FIG. 3 illustrates an exemplary process for identifying a subject.

FIG. 3 illustrates an exemplary process 300 for identifying a subject. Process 300 begins in block 305 when mobile device 104 receives identification data relating to a subject 106. As previously discussed, the identification data may be in a variety of forms such as images, sounds, and biometric data. The identification data may be acquired from the user's mobile device 104, such as a contact from the mobile device's contact list, or the identification may be acquired using a hardware device included in the mobile device 104, such a camera or microphone.

Next, in block 310, the type of identification data is determined. For example, mobile device 104 determines whether the received identification data is a voice recording, a picture of a person's face, a biometric scan, a picture of a barcode, or some other type of identification data. In one example, mobile device 104 may be configured to process identification data in a certain way based on the type of data, as discussed in greater detail below.

Next, in block 315, mobile device 104 performs a local analysis of the identification data to identify the subject. For example, the identification data may be a picture of subject 106. Mobile device 104 may attempt to identify subject 105 by using facial recognition software, and comparing the photo to other photos stored within mobile device 104. In another example, the identification data may be a voice recording of subject 106. Mobile device 104 may compare the voice recording with stored sound recordings within mobile device 104. Further, the identification data may be a scan or image of a barcode, and mobile device 104 may include a local database or table of identities associated with various barcodes.

Next, in decision diamond 320, mobile device 104 determines if the subject can be identified locally. If the subject can be identified locally, process 300 proceeds to block 330. If the subject cannot be identified locally, possibly based on the type of identification data as determined in block 310, process 300 proceeds to block 330. In one example, mobile device 104 may be configured to analyze certain types of identification data locally, such as barcodes, while sending other types of identification data to a remote device for analysis.

In block 325, the identity of subject 106 is provided based on the identification data. Following block 325, process 300 ends. As discussed in detail below with respect to FIG. 4, the identity of subject 106 can be utilized to search for, organize, and summarize data from multiple data services In block 330, mobile device 104 requests remote analysis of the identification data. For example, mobile device 104 may send the identification data to identification service 130 for assistance. Identification service 130 may then attempt to ascertain an identity of subject 106 based on the identification data.

Next, in decision diamond 335, it is determined whether subject 106 can be identified remotely. For example, identification service 130 may determine that the subject cannot be identified for any number of reasons, including corrupt or insufficient identification data (e.g., blurry photo or unclear voice recording), or that no match was found in the searched databases. If subject 106 can be identified remotely, then process 300 proceeds to block 325 and the identity is provided to mobile device 104 for further analysis. If subject 106 cannot be identified remotely, then process 300 proceeds to block 340.

In block 340, a status message is provided. For example, identification server 130 may provide a message to mobile device 140 that the subject cannot be identified. Such a message may include details as to why subject 106 could not be identified. Further, such a message may be provided to a user of mobile device 104. For example, mobile device 104 may inform a user that the identification data was insufficient, corrupt, or that no match was found when searching. Following block 340, process 300 ends.

Figure 4:
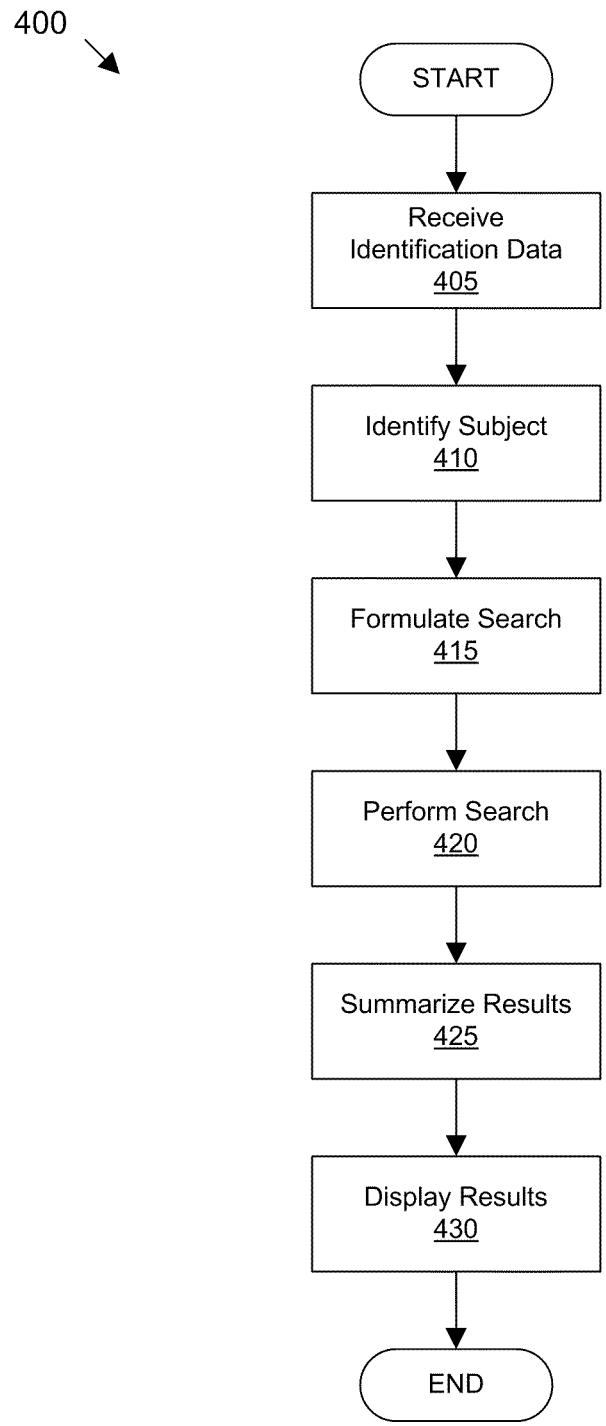
FIG. 4 illustrates an exemplary process for searching, organizing, and summarizing data from multiple data services.

FIG. 4 illustrates an exemplary process 400 for searching, organizing, and summarizing data from multiple data services for a subject 106. Process 400 begins in block 405 when mobile device 104 receives identification data relating to a subject 106. As previously discussed, the identification data may be in a variety of forms such as images, sounds, and biometric data.

Next, in block 410, the subject is identified based on the identification data, as discussed above with respect to process 300. If mobile device 104 can identify subject 106 locally, then the identity of subject 106 will be used to initiate a search. If mobile device 104 cannot identify subject 106, mobile device 104 may send the identification data to identification service 130 for assistance. Identification service 130 may store any number of identifying characteristics of a subject 106, or may communicate with various databases that store such information. If a subject 106 is identified, identification service 130 may send the identity of subject 106 back to the requesting mobile device 104.

Next, in block 415, a search is formulated based on the identified subject. In one example, mobile device 104 formulates the search. In another example, aggregation service 140 receives a request from mobile device 104 and then formulates a search. As mentioned, the search may be initiated automatically upon recognition of the identification data. The user may also be prompted by an option block to initiate the search upon identification of the subject. Once the search is initiated, the search may be formulated and narrowed using any number of criteria. As discussed in reference to FIGS. 2A-2C, a user may specify certain search criteria and/or filter options. In the absence of a user defined search criteria, mobile device 104 may apply a default search criteria. In one example, the default search criteria would include a sequence of data services 120 to search.

Next, in block 420, after receiving the search criteria from block 415, a search is performed for the identified subject, as defined by the search criteria. Mobile device 104 may search various data services 120, such as customer resource management systems, contact management systems, project management systems, and social networks such as Facebook®, YouTube®, LinkedIn®, MySpace®, as well as any other data service that facilitates the sharing of personal and/or professional information between a user 102 and a subject 106. In another example, aggregation service 140 performs the search on all or a subset of data services 120.

Next, in block 425, the query data received from block 420 is summarized for user 102. During the summarization, multiple factors, as discussed, are taken into consideration and used to generate the report.

Next, in block 430, the summarized data is displayed for user 102 via the user interface of mobile device 104. The summarization provides a readable, concise, and organized display on the user interface. For example, the subject's name may be displayed at the top, possibly accompanied by a photo. Below the subject's name may be a "Professional" heading followed by a list of bullet points with the subjects open projects and due dates, for example. Further, under a "Personal" heading, a list of bullet points may include his pets, interests, or some other summarized personal information.

The display could list the organized data in bullet point lists, one or more progress bars, or even in a graphical display such as balloons. The type of display may depend on any number of factors, including whether user 102 and subject 106 share a personal and/or professional relationship. For example, where user 102 and subject 106 are co-workers, the summarized data may be displayed using one or more progress bars to illustrate the progress of shared projects between the user and the subject. In another example, a progress bar may be provided to illustrate the social compatibility between user 102 and subject 106. For instance, in comparing the user's personal information with the subject's personal information, the progress bar display may indicate how much the user and the subject have in common.

Further, the display may also include links in which the user may select to be linked to either the source of the data (e.g., data service 120 storing the data), or even to view a more elaborate report generated by mobile device 104. For example, the display could have a link to subject's Facebook® page, or blog. The display could also include an option for user 102 to further search within the displayed results. In other words, the user could further narrow the summarized search results. User 105 may further define additional search criteria through options blocks previously discussed with reference to FIGS. 2A-2C.

Mobile device 104 may conduct additional search following the initial search and summarization. For example, mobile device 104 may automatically detect a potential keyword or context-based search criteria and automatically generate a search for data relating to the identified subject and the updated search criteria. For example, if the user is in a meeting, and certain key terms are being discussed, mobile device 104 may detect certain spoken keywords via a microphone and conduct additional searches based on those keywords. Further, mobile device 104 may conduct additional searches based on the physical location of the mobile device. For instance, mobile device may determine that the physical location is associated with a hobby of the identified subject, and conduct additional searches for that particular hobby. Thus, mobile device 104 can provide automatically generated updated data about the subject during a conversation, for example. Thus, the user may have information regarding the topics discussed in the meeting at his or her immediate access.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Moreover, the use of criteria also includes the use of criterion in the singular sense.

The invention claimed is:

1. A system, comprising:
 a plurality of data services; and
 a mobile device configured to communicate via a network with at least a subset of the plurality of data services, the mobile device being configured to:
  receive identification data relating to a subject,
  determine whether the subject can be identified locally,
  determine an identity of the subject using the identification data,
  establish search criteria,
  search at least a subset of the plurality of data services for data relating to the identified subject, and
  provide a summary of the data, wherein the data is summarized using a plurality of factors.

2. The system of claim 1, further comprising an aggregation system configured to communicate via a network with the mobile device, the aggregation system configured to:
 receive a request to conduct a search from the mobile device;
 search at least a subset of the plurality of data services to access data relating to the identified subject;
 summarize the data; and
 provide the summarized data to the mobile device.

3. The system of claim 2, further comprising an identification system configured to communicate via a network with the mobile device, the identification system configured to: receive at least a subset of the identification data from the mobile device; identify the subject using the identification data; and provide an identity of the subject to at least one of the aggregation system and the mobile device.

4. The system of claim 1, wherein the mobile device is further configured to request remote analysis of at least a subset of the identification data when the subject cannot be identified locally.

5. The system of claim 1, the search criteria being at least one of a user defined criteria and a contextual criteria, the search criteria including at least one of a personal filter, a professional filter, a date filter, a location filter, a proximity filter, a quantity filter and a frequency filter.

6. The system of claim 1, further comprising a second mobile device associated with the subject and configured to communicate identification data relating to the subject to the first mobile device.

7. The system of claim 1, the summarized data includes at least one of a list display, a map display, and a progress bar display.

8. The system of claim 7, wherein the summarized data is displayed with respect to at least one of the quantity of data, the frequency of data, the date of data, the location of data, and the type of data.

9. The system of claim 7, wherein the summarized data is displayed in response to a relationship between the user and the subject, the relationship established by at least one of the mobile device and data services.

10. The system of claim 1, wherein the identified subject is selected from a plurality of potential subjects using information accompanying the identification data stored within the mobile device, wherein the potential subjects are located in the subset of the plurality of data services and identified via the identification data.

11. A method, comprising:
receiving identification data relating to a subject in a mobile device;
determining, by the mobile device, whether the subject can be identified locally;
identifying the subject using the identification data;
establishing search criteria;
searching, utilizing a computing device, multiple data services for data relating to the identified subject; and
providing a summary of the data, wherein the data is summarized using a plurality of factors.

12. The method of claim 11, further comprising:
requesting remote analysis of at least a subset of the identification data when the subject cannot be identified locally.

13. The method of claim 11, further comprising:
sending at least a subset of the identification data to an identification system; and
receiving an identity of the subject from the identification system.

14. The method of claim 11, further comprising:
sending a request to an aggregation system, the request including the identity of the subject and a plurality of search criteria, including a list of data services to search; and
receiving the summarized data from the aggregation system in the mobile device.

15. The method of claim 14, further comprising an identification system configured to communicate via a network with the mobile device, the identification system configured to: receive at least a subset of the identification data from the mobile device; identify the subject using the identification data; and provide an identity of the subject to at least one of the aggregation system and the mobile device.

16. The method of claim 11, further comprising performing a second search for data relating to the identified subject utilizing a context-based search criteria, wherein the context-based search criteria includes at least one of a spoken keyword and a physical location.

17. The method of claim 11, the search criteria including at least one of a personal filter, professional filter, date filter, location filter, proximity filter, quantity filter, and frequency filter.

18. The method of claim 11, further comprising receiving identification data in a first mobile device from a second mobile device.

19. The method of claim 11, further comprising displaying the summarized data utilizing at least one of a list display, a map display, and a progress bar display.

20. The system of claim 19 further comprising displaying summarized data with respect to at least one of the quantity of data, the frequency of data, the date of data, the location of data, and the type of data.

21. The system of claim 20, wherein the summarized data is displayed in response to a relationship between the user and the subject, the relationship established by at least one of the mobile device and data services.

22. The system of claim 11, further comprising selecting the identified subject from a plurality of potential subjects using information accompanying the identification data stored within the mobile device, wherein the potential subjects are located in the subset of the plurality of data services and identified via the identification data.

23. An apparatus, comprising:
a communications interface configured to facilitate data communications with a plurality of data services via a network;
a processor; and
a computer readable medium including instructions executable on the processor including instructions to:
receive identification data relating to a subject,
determine whether the subject can be identified locally,
identify the subject using the identification data,
establish search criteria,
search at least a subset of the plurality of data services for data relating to the identified subject, and
provide a summary of the data, wherein the data is summarized using a plurality of factors.

24. The apparatus of claim 23, further comprising instructions to perform a second search for data relating to the identified subject utilizing a context-based search criteria, wherein the context-based search criteria includes at least one of a spoken keyword and a physical location.

25. The apparatus of claim 23, the search criteria including at least one of a personal filter, professional filter, date filter, location filter, proximity filter, and frequency filter.

26. The apparatus of claim 23, further comprising instructions to receive identification data from a second mobile device.

27. The apparatus of claim 23, further comprising instructions to request remote analysis of at least a subset of the identification data when the subject cannot be identified locally.

28. The apparatus of claim 23, further comprising instructions to select the subject from a plurality of potential subjects using information accompanying the identification data, wherein the potential subjects are located in the subset of the plurality of data services and identified via the identification data.

* * * * *